US008817809B2

(12) United States Patent
Gage (10) Patent No.: US 8,817,809 B2
(45) Date of Patent: Aug. 26, 2014

(54) COMMUNICATION LINK ALLOCATION BASED ON DYNAMIC TREND ANALYSIS (75) Inventor: Kenneth Lee Gage, Glendale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 12/140,919

(22) Filed: Jun. 17, 2008

(65) Prior Publication Data

US 2008/0310443 A1 Dec. 18, 2008

Related U.S. Application Data (60) Provisional application No. 60/944,642, filed on Jun. 18, 2007.

(51) Int. Cl.
*H04J 3/26* (2006.01)
*H04L 12/28* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................... 370/432; 370/431; 370/235

(58) Field of Classification Search
USPC .................................................. 370/235, 432
See application file for complete search history.

(56) References Cited

U.S. PATENT DOCUMENTS

| 6,016,307 | A | * | 1/2000 | Kaplan et al. | 370/238 |
| 6,947,957 | B1 | * | 9/2005 | Lange | 714/25 |
| 2003/0110276 | A1 | * | 6/2003 | Riddle | 709/230 |
| 2006/0193295 | A1 | * | 8/2006 | White et al. | 370/336 |
| 2006/0268729 | A1 | * | 11/2006 | Huang et al. | 370/252 |
| 2006/0291378 | A1 | * | 12/2006 | Brotherston et al. | 370/221 |
| 2007/0030855 | A1 | | 2/2007 | Ribiere et al. | |

(Continued)

FOREIGN PATENT DOCUMENTS

| WO | 0011842 | | 3/2000 |
| WO | WO 2006045345 | A2 * | 5/2006 |
| WO | 2007048247 | | 5/2007 |

OTHER PUBLICATIONS

Kashihara et al., "Path Selection Using Active Measurement in Multi-Homed Wireless Networks", Applications and the Internet, 2004 Proceedings. 2004 International Symposium on Tokyo, Japan Jan. 26-30, 2004, Los Alamitos, CA USA, IEEE Comput. Soc, US, Jan. 26, 2004, pp. 273-276.

(Continued)

*Primary Examiner* — Noel Beharry
*Assistant Examiner* — Farhad Ali
(74) *Attorney, Agent, or Firm* — Linda G. Gunderson (57) ABSTRACT

A method and/or apparatus is provided for performing traffic allocation based on dynamic trend analysis of communication links between two devices. Devices monitor the performance of their available communication links to determine which communication link is best to receive transmissions on. A device selects the best communication link on which to receive from another device and informs that other device to use that communication link when transmitting to it. Link information is obtained from both the transmitting device and receiving device to perform traffic allocation for communications between the two devices. This method may be performed by a low-level communication module transparent to applications and/or network transmission protocols.

45 Claims, 5 Drawing Sheets

(56) References Cited

U.S. PATENT DOCUMENTS

| | | | |
|---|---|---|---|
| 2007/0097945 A1* | 5/2007 | Wang et al. | 370/349 |
| 2007/0115840 A1* | 5/2007 | Feick et al. | 370/252 |
| 2008/0008178 A1 | 1/2008 | Tychon et al. | |
| 2008/0095173 A1* | 4/2008 | Bugenhagen | 370/395.21 |
| 2008/0225713 A1* | 9/2008 | Tychon et al. | 370/231 |

OTHER PUBLICATIONS

International Search Report, PCT/US08/067407—International Search Authority—European Patent Office—Dec. 15, 2008.

Written Opinion, PCT/US08/067407—International Search Authority—European Patent Office—Dec. 15, 2008.

Taiwan Search Report—TW097122785—TIPO—Mar. 1, 2012.

* cited by examiner

COMMUNICATION LINK ALLOCATION BASED ON DYNAMIC TREND ANALYSIS

RELATED APPLICATIONS

The present Application for Patent claims priority to Provisional Application No. 60/944,642 entitled "COMMUNICATION LINK ALLOCATION BASED ON DYNAMIC TREND ANALYSIS" filed Jun. 18, 2007 which is hereby expressly incorporated by reference in its entirety.

FIELD

Various examples relate generally to network traffic allocation, and more particularly to a method where a receiving device performs dynamic link allocation for communications with a transmitting device.

BACKGROUND

In network communications, it is often desirable to intelligently balance the flow of information between multiple network devices. That is, data transmissions over a network may be monitored and directed so that the best available communication channel between two communication devices is used. This is sometimes accomplished by ascertaining channel information from a transmission protocol. For example, Transmission Control Protocol (TCP) guarantees reliable and in-order delivery of data packets from sender to receiver by using an acknowledgement scheme to indicate whether each data packet is received. By using packet size information, transmission time information, and acknowledge messages, traffic information on a particular channel between two network devices may be ascertained. While such data traffic management permits sender-side devices to evaluate conditions of a transmission channel, it gives receiver-side devices little choice on which channel to receive on.

Additionally, transmission information between two devices is not always available. For instance, voice-over IP utilizes a user data protocol (UDP) that does not provide the reliability and ordering guarantees that TCP does. Consequently, it is difficult to ascertain transmission information and perform traffic management using UDP.

Even where traffic management is feasible, conventional traffic distribution algorithms often fail to account for variances in communication links. That is, in a communication system where multiple links are available between two devices, many traffic distribution algorithms fail to recognize that one link may be better in one direction than the other link and/or take advantage of this information for more efficient communications.

Hence, it is desirable to find a traffic allocation scheme that intelligently transmits data over multiple links with unique characteristics.

SUMMARY

A method and/or device is provided for performing traffic allocation based on dynamic trend analysis of communication links between two devices. That is, devices monitor the performance of their available communication links to determine which communication link is best to receive transmissions on. A device selects the best communication link on which to receive from another device and informs that other device to use that communication link when transmitting to it. This approach is counter to conventional traffic allocation methods where a transmitting device determines which link to use when transmitting to a receiving device. Instead, the present approach utilizes link information obtained from both the transmitting device and receiving device to perform traffic allocation for communications between the two devices. This method may be performed by a low-level communication module transparent to applications and/or network transmission protocols.

A method is provided on a first device that receives heartbeat signals over a plurality of communication links from a second device. One or more communication link characteristics for the plurality of communication links are obtained from the received heartbeat signals. A preferred communication link is selected from the plurality of communication links having the best characteristics for reception. The second device is informed to use the preferred communication link to send data. Data is received from the second device over the preferred communication link and the received data may be decompressed. Additional heartbeat signals are received over the plurality of communication links from the second device. A communication tunnel may also be established with the second device through the preferred communication link. The one or more communication link characteristics may include at least one of bandwidth, delay, and jitter.

One or more communication link characteristics may be monitored from the received heartbeats to determine whether a better communication link is available to receive data from the second device. A second communication link may be selected to receive data from the second device if one or more of its link characteristics is better than the corresponding link characteristics for the preferred communication link. The second device is informed to use the second communication link to send data to the first device. The first device may then receive data from the second device over the second communication link.

Heartbeat signals may also be sent over the plurality of communication links to the second device. A message may be received from the second device indicating a third communication link to transmit data to the second device. A communication tunnel may be established with the second device through the third communication link and data may be transmitted to the second device over the third communication link.

A first communication module is also provided comprising a communication link analyzer, a link selector coupled to the communication link analyzer, and a receiver. The communication link analyzer may be configured to (a) receive heartbeat signals over a plurality of communication links from a second communication module, and (b) obtain one or more communication link characteristics for the plurality of communication links from the received heartbeat signals. The link selector may be configured to (a) select a preferred communication link from the plurality of communication links having the best characteristics for reception, and (b) inform the second communication module to use the preferred communication link to send data to the first communication module. The receiver may be configured to receive data from the second communication module over the preferred communication link.

The communication link analyzer may be further configured to (a) receive additional heartbeat signals over the plurality of communication links from the second communication module, (b) monitor one or more communication link characteristics from the received heartbeats, and (c) determine whether a better communication link is available to receive data from the second communication module.

The link selector may be further configured to select a second communication link to (a) receive data from the second communication module if one or more of its link characteristics is better than corresponding link characteristics for the preferred communication link, and (b) inform the second communication module to use the second communication link to send data to the first communication module. The receiver may be further configured to receive data from the second communication module over the second communication link.

The first communication module may further comprise a transmitter, a link indicator, and a demultiplexer module. The transmitter may be configured to send heartbeat signals over the plurality of communication links to the second communication module. The link indicator storage device may be configured to receive a message from the second communication module indicating a third communication link to transmit data to the second communication module. The demultiplexer module may be coupled to the transmitter and configured to route data to the second communication module over the third communication link.

Consequently a first communication module is provided comprising: (a) means for receiving heartbeat signals over a plurality of communication links from a second communication module; (b) means for obtaining one or more communication link characteristics for the plurality of communication links from the received heartbeat signals; (c) means for selecting a preferred communication link from the plurality of communication links having the best characteristics for reception; (d) means for informing the second communication module to use the preferred communication link to send data to the first communication module; (e) means for receiving data from the second communication module over the preferred communication link; (f) means for receiving additional heartbeat signals over the plurality of communication links from the second communication module; (g) means for monitoring one or more communication link characteristics from the received heartbeats; (h) means for determining whether a better communication link is available to receive data from the second communication module; (i) means for selecting a second communication link to receive data from the second communication module if one or more of its link characteristics is better than corresponding link characteristics for the preferred communication link; (j) means for informing the second communication module to use the second communication link to send data to the first communication module; (k) means for receiving data from the second communication module over the second communication link; (l) means for establishing a communication tunnel with the second communication module through the preferred communication link; (m) means for sending heartbeat signals over the plurality of communication links to the second communication module; (n) means for receiving a message from the second communication module indicating a third communication link to transmit data to the second communication module; and/or (o) means for transmitting data to the second communication module over the third communication link.

A computer-readable medium is also provided having one or more instructions operational on a first device for dynamic communication link allocation, which when executed by a processor causes the processor to: (a) receive heartbeat signals over a plurality of communication links from a second device; (b) obtain one or more communication link characteristics for the plurality of communication links from the received heartbeat signals; (c) select a preferred communication link from the plurality of communication links having the best characteristics for reception; (d) inform the second device to use the preferred communication link to send data; (e) receive data from the second device over the preferred communication link; (f) receive additional heartbeat signals over the plurality of communication links from the second device; (g) monitor one or more communication link characteristics from the received heartbeats; (h) determine whether a better communication link is available to receive data from the second device; (i) select a second communication link to receive data from the second device if one or more of its link characteristics is better than corresponding link characteristics for the preferred communication link; (j) inform the second device to use the second communication link to send data to the first device; (k) receive data from the second device over the second communication link; (l) send heartbeat signals over the plurality of communication links to the second device; (m) receive a message from the second device indicating a third communication link to transmit data to the second device; and/or (n) transmit data to the second device over the third communication link.

A processor is also provided comprising a circuit configured to (a) receive heartbeat signals over a plurality of communication links from a second device; (b) obtain one or more communication link characteristics for the plurality of communication links from the received heartbeat signals; (c) select a preferred communication link from the plurality of communication links having the best characteristics for reception; (d) inform the second device to use the preferred communication link to send data; (e) receive data from the second device over the preferred communication link; (f) receive additional heartbeat signals over the plurality of communication links from the second device; (g) monitor one or more communication link characteristics from the received heartbeats; (h) determine whether a better communication link is available to receive data from the second device; (i) select a second communication link to receive data from the second device if one or more of its link characteristics is better than corresponding link characteristics for the preferred communication link; (j) informing the second device to use the second communication link to send data to the first device; (k) receiving data from the second device over the second communication link; (l) send heartbeat signals over the plurality of communication links to the second device; (m) receive a message from the second device indicating a third communication link to transmit data to the second device; (n) establish a communication tunnel with the second device through the third communication link; and/or (o) transmit data to the second device over the third communication link.

A method is also provided on a first device that sends heartbeat signals over a plurality of communication links to a second device. A message may be received from the second device indicating a preferred communication link to transmit data to the second device. Data is then transmitted to the second device over the third communication link. The preferred communication link may be selected by the second device using the heartbeat signals to ascertain one or more communication link characteristics. A communication tunnel may be established with the second device through the preferred communication link.

A second message may be received from the second device indicating a second communication link to transmit data to the second device, thereby causing data to be transmitted to the second device over the second communication link instead of the preferred communication link.

Heartbeat signals may be received over the plurality of communication links from the second device. One or more communication link characteristics may be received for the plurality of communication links from the received heartbeat signals. A third communication link may be selected from the plurality of communication links having the best characteristics for reception. The second device may be informed to use the third communication link to send data to the first device. Data may be received from the second device over the third communication link.

A first communication module is also provided comprising a transmitter, a link indicator storage device, and/or a demultiplexer module. The transmitter may be configured to send heartbeat signals over a plurality of communication links to a second communication module. The link indicator storage device may be configured to receive a message from the second communication module indicating a third communication link to transmit data to the second communication module. The demultiplexer module may be coupled to the transmitter to route data to the second communication module over the third communication link. The link indicator may be further configured to receive a second message from the second device indicating a second communication link to transmit data to the second device. The demultiplexer module may be further configured to route data to the second device over the second communication link instead of the preferred communication link. The first communication module may further include a communication link analyzer, a link selector, and a receiver. The communication link analyzer may be configured to (a) receive heartbeat signals over a plurality of communication links from a second communication module, and (b) obtain one or more communication link characteristics for the plurality of communication links from the received heartbeat signals. The link selector is coupled to the communication link analyzer and configured to (a) select a preferred communication link from the plurality of communication links having the best characteristics for reception, and (b) inform the second communication module to use the preferred communication link to send data to the first communication module. The receiver may be configured to receive data from the second communication module over the preferred communication link.

Consequently, a first communication module is also provided comprising (a) means for sending heartbeat signals over a plurality of communication links to a second device; (b) means for receiving a message from the second device indicating a preferred communication link to transmit data to the second device; (c) means for transmitting data to the second device over the third communication link; (d) means for receiving a second message from the second device indicating a second communication link to transmit data to the second device; (d) means for transmitting data to the second device over the second communication link instead of the preferred communication link; (e) means for receiving heartbeat signals over the plurality of communication links from the second device; (f) means for obtaining one or more communication link characteristics for the plurality of communication links from the received heartbeat signals; (g) means for selecting a third communication link from the plurality of communication links having the best characteristics for reception; (h) means for informing the second device to use the third communication link to send data to the first device; and/or (i) means for receiving data from the second device over the third communication link.

A computer-readable medium is also provided having one or more instructions operational on a first device for dynamic communication link allocation, which when executed by a processor causes the processor to: (a) send heartbeat signals over a plurality of communication links to a second device; (b) receive a message from the second device indicating a preferred communication link to transmit data to the second device; (c) transmit data to the second device over the third communication link; (d) receive a second message from the second device indicating a second communication link to transmit data to the second device; (e) transmit data to the second device over the second communication link instead of the preferred communication link; (f) receive heartbeat signals over the plurality of communication links from the second device; (g) obtain one or more communication link characteristics for the plurality of communication links from the received heartbeat signals; (h) select a third communication link from the plurality of communication links having the best characteristics for reception; (i) inform the second device to use the third communication link to send data to the first device; and/or (j) receive data from the second device over the third communication link. The preferred communication link may be selected by the second device using the heartbeat signals to ascertain one or more communication link characteristics.

A processor is also provided comprising a circuit configured to (a) send heartbeat signals over a plurality of communication links to a second device; (b) receive a message from the second device indicating a preferred communication link to transmit data to the second device; (c) transmit data to the second device over the third communication link; (d) establish a communication tunnel with the second device through the preferred communication link; (e) receive a second message from the second device indicating a second communication link to transmit data to the second device; (f) transmit data to the second device over the second communication link instead of the preferred communication link; (g) receive heartbeat signals over the plurality of communication links from the second device; (h) obtain one or more communication link characteristics for the plurality of communication links from the received heartbeat signals; (i) select a third communication link from the plurality of communication links having the best characteristics for reception; (j) inform the second device to use the third communication link to send data to the first device; and/or (k) receive data from the second device over the third communication link.

DETAILED DESCRIPTION

In the following description, specific details are given to provide a thorough understanding of the examples. However, it will be understood by one of ordinary skill in the art that the examples may be practiced without these specific details. For instance, circuits may not be shown in block diagrams in order not to obscure the examples in unnecessary detail. Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Furthermore, various configurations may be implemented by hardware, software, firmware, middleware, microcode, or a combination thereof. When implemented in software, firmware, middleware, microcode, or the program code, the configurations to perform the described tasks may be stored in a computer-readable medium such as a storage medium or other storage means. A processor may perform the defined tasks. A code may represent a procedure, a function, a subprogram, a program, a routine, a subroutine, a module, a software package, a class, or a combination of instructions, data structures, or program statements. Information, arguments, parameters, data, and the like, may be passed, forwarded, or transmitted via a suitable means including memory sharing, message passing, token passing, and network transmission, among others. The methods disclosed herein may be implemented in hardware, software, or both.

If functions are implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Moreover, a storage medium may represent one or more devices for storing data, including read-only memory (ROM), random access memory (RAM), magnetic disk storage mediums, optical storage mediums, flash memory devices, and/or other computer-readable mediums for storing information.

The various illustrative functions, logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One feature provides a method for performing traffic allocation based on dynamic trend analysis of communication links between two devices. That is, devices monitor the performance of their available communication links to determine which communication link is best to receive transmissions on. A device selects the best communication link on which to receive from another device and informs that other device to use that communication link when transmitting to it. This approach is counter to conventional traffic allocation methods where a transmitting device determines which link to use when transmitting to a receiving device. Instead, the present approach utilizes link information obtained from both the transmitting device and receiving device to perform traffic allocation for communications between the two devices. This method may be performed by a low-level communication module transparent to applications and/or network transmission protocols.

Figure 1:
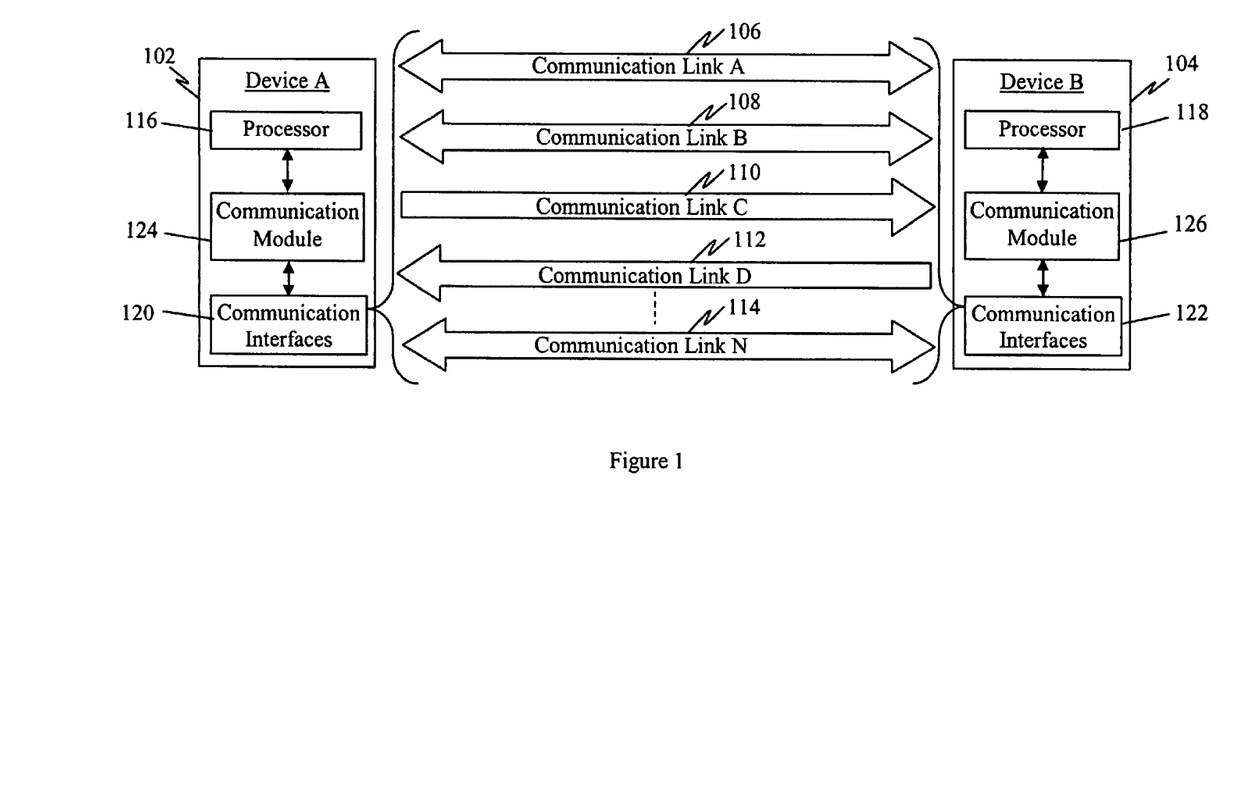
FIG. 1 is a block diagram illustrating a system in which traffic allocation is performed based on dynamic trend analysis of a plurality of communication links between two devices.

FIG. 1 is a block diagram illustrating a system in which traffic allocation is performed based on dynamic trend analysis of a plurality of communication links between two devices. Device A 102 and a Device B 104 may have multiple communication links through which they can transmit data in one or both directions. For example, Communication Links A 106, B 108, and N 114 may be capable of two-way transmission while Communication Link C 110 and Communication Link D 112 may be capable of one-way transmissions between Devices A 102 and B 104.

The communication links may be established over wired and/or wireless transmission mediums and may include other intervening communication devices and/or networks between Device A 102 and Device B 104. For example, Communication Link A 106 may be a satellite-based communication link, Communication Link B 108 may be a cellular communication network, and/or Communication Link N 114 may be a private communication network. By nature, the communication links may have different and/or varying transmission characteristics that make load distribution decisions very difficult. For example, a communication link may exhibit a variable transmission delay and/or each communication link may have different transmission and/or propagation delays (e.g., delays between 100 milliseconds and 1000 milliseconds). Additionally, communication links may also exhibit lost packets and variable performance, where each communication link may perform differently without advanced indicators. For example, the bandwidths of one or more communication links may vary or change independently thereby affecting the performance over such communication links. Moreover, a communication link may die or become unavailable, independent of other communication links and without warning. Communication links may also exhibit variable recovery times when dies and/or is reestablished.

Devices A 102 and B 104 may include communication interfaces 120 and 122 coupled to a communication module 124 and 126 which is coupled to a processor 116 and 118, respectively. The communication interfaces 120 and 122 allow Devices A 102 and B 104, respectively, to establish the one or more communication links (e.g., communication links A 106, B 108, C 110, D 112, E 114). Communication modules 124 and 126 are configured to perform dynamic trend analysis on the available communication links to determine the best communication link to use. Processors 116 and 118 may execute applications (e.g., voice over IP, internet, email, digital audio/video, etc.) that generate data for transmission. When Device A 102 initiates a data transfer with Device B 104, Device B 104 may be configured to determine the available communication links with Device A 102 and ascertain the best communication link on which to receive data from Device A 102. The best communication link may be selected based on, for example, link throughput, jitter, and/or delay for each of the available communication links.

Figure 2:
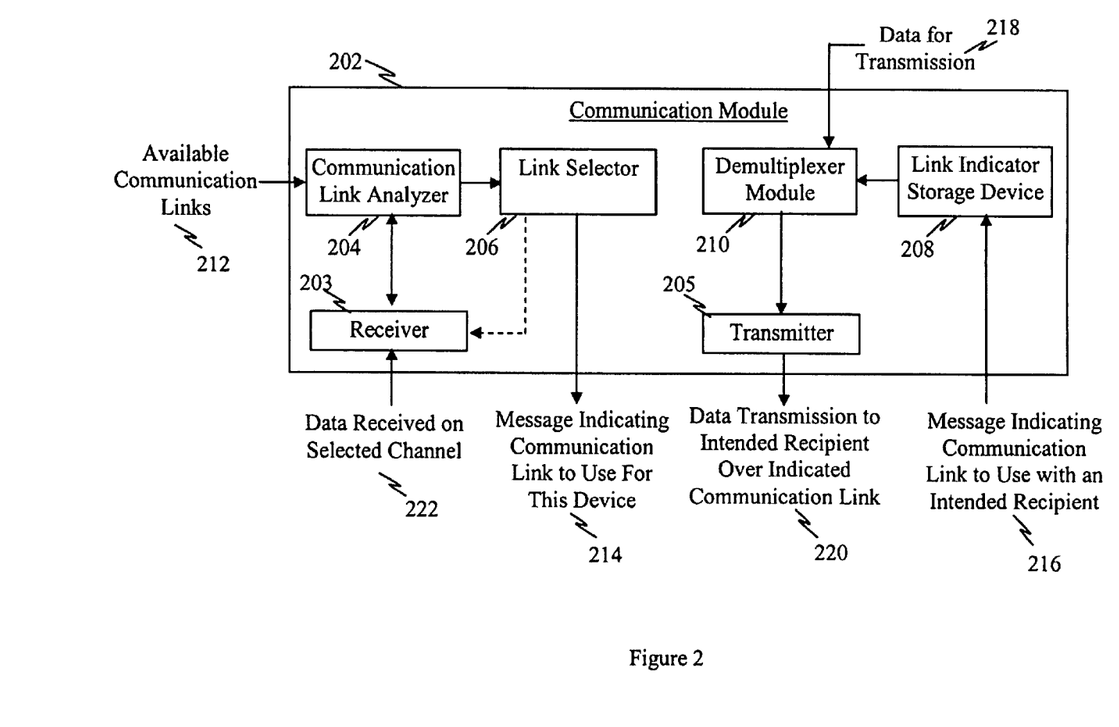
FIG. 2 is a block diagram illustrating an example of functional components of a communication module configured to perform dynamic traffic allocation.

FIG. 2 is a block diagram illustrating an example of functional components of a communication module 202 configured to perform dynamic traffic allocation. The communication module 202 may include a receiver 203, a transmitter 205, a communication link analyzer 204, a link selector 206, a link indicator storage device 208, and a demultiplexer module 210. The communication link analyzer 204 may be configured to perform tests on available communication links 212 (e.g., via receiver 203 and/or transceiver 205) to ascertain one or more characteristics of those communication links 212. For example, the communication link analyzer 204 may be configured to monitor for conditions causing a decrease in traffic through a specific link. This may be accomplished, for instance, by noting a trend of increasing delay times and/or trend of decreasing performance over such link. Similarly, the communication link analyzer 204 may be configured to monitor conditions causing an increase in traffic through a specific link. For instance, the communication link analyzer 204 may ascertain whether delay times over the specific link has decreased or overall performance has otherwise improved. The communication link analyzer may also monitor link conditions to determine whether a specific link should be removed from the "available" communication links. For instance, the communication link analyzer may determine whether a specific communication link exhibits a trend of increasing delay times beyond established tolerances and/or a trend of decreasing performance beyond established tolerances. That is, if a specific communication link exhibits poor performance, then the communication link analyzer 204 may remove it from the available communications links 212 on which to transmit and/or receive data. Similarly, the communication link analyzer 204 may monitor for conditions to restore or add a specific link to the available communication links 212. For instance, a communication link may be restored or added if its delay times decrease or reach an allowable level or link performance is otherwise restored or improved.

Based on the link analysis information obtained by the communication link analyzer 204, the link selector 206 may select one or more links on which receiver 203 may receive data and/or transmitter 205 may transmit data. For example, the link selector 206 may determine a specific link to use when communicating with a particular device. A message 214 may be sent (e.g., via transmitter 205) that indicates which communication link should be used to transmit to this communication module 202. For instance, receiver 203 may be configured to receive on the selected specific communication link from a particular device. In one implementation, receiver 203 may receive data simultaneously from different devices on different selected communication links, where each selected communication link may be associated with a different transmitting device.

In one example, the communication module 202 device may also select a preferred communication link (from one or more available communication links) by analyzing conditions (e.g., bandwidth, traffic, delay, etc.) on a plurality of communication links based on data being transmitted and/or received on those communication links.

Yet another feature provides for a communication module 202 to rank two or more communication links in order of preference and provide such order of preference to a transmitting communication module. The transmitting communication module 202 may then use the order of preference of communication links to transmit information.

The link indicator storage device 208 may receive messages 216 from other devices indicating what specific communication link (from the available communication links 212) should be used when transmitting to each of those other devices. When an application sends data to another device, the data 218 is routed by the demultiplexer module 210 to the indicated specific communication link via transmitter 205. The demultiplexer module 210 may dynamically route multiple data packets and/or communication channels to the indicated communication link(s) 220. In this manner, the communication module 202 may increase overall bandwidth and/or attempts to maintain a constant communication link. In one example, transmitter 205 may transmit data simultaneously on different indicated communication links, where each indicated communication link may be associated with a different receiving device.

Communication modules may be present at either end of a communication link. In one implementation, IP tunnels may be created between two communication modules through one or more selected communication links. IP tunnels may allow data to be transmitted more quickly by shrinking overhead. For instance, general routing encapsulation (GRE) tunnels may be established between two communication modules on different devices. In one implementation, heartbeats or pings may be sent through each tunnel to provide feedback regarding the health, characteristics, and/or condition of the associated communication link. These heartbeats or pings may be sent through the available communication links from each communication module. In one implementation, the heartbeats may be one-way pings that receiving communication modules can use to ascertain the health of the communication link on which it was received. Alternatively, the heartbeats may be roundtrip pings that enable a communication module to ascertain the health of its communication links.

Based on the characteristics, health, and/or conditions of the one or more communication links, communication module 202 may establish a route priority for each device with which it communicates. The preference and/or selection of communication links may be dynamically changed or updated based on the percentage of traffic distributed over each link. In this manner, communication links may be dynamically added and removed by both a receiving communication module and a transmitting communication module.

Figure 3:
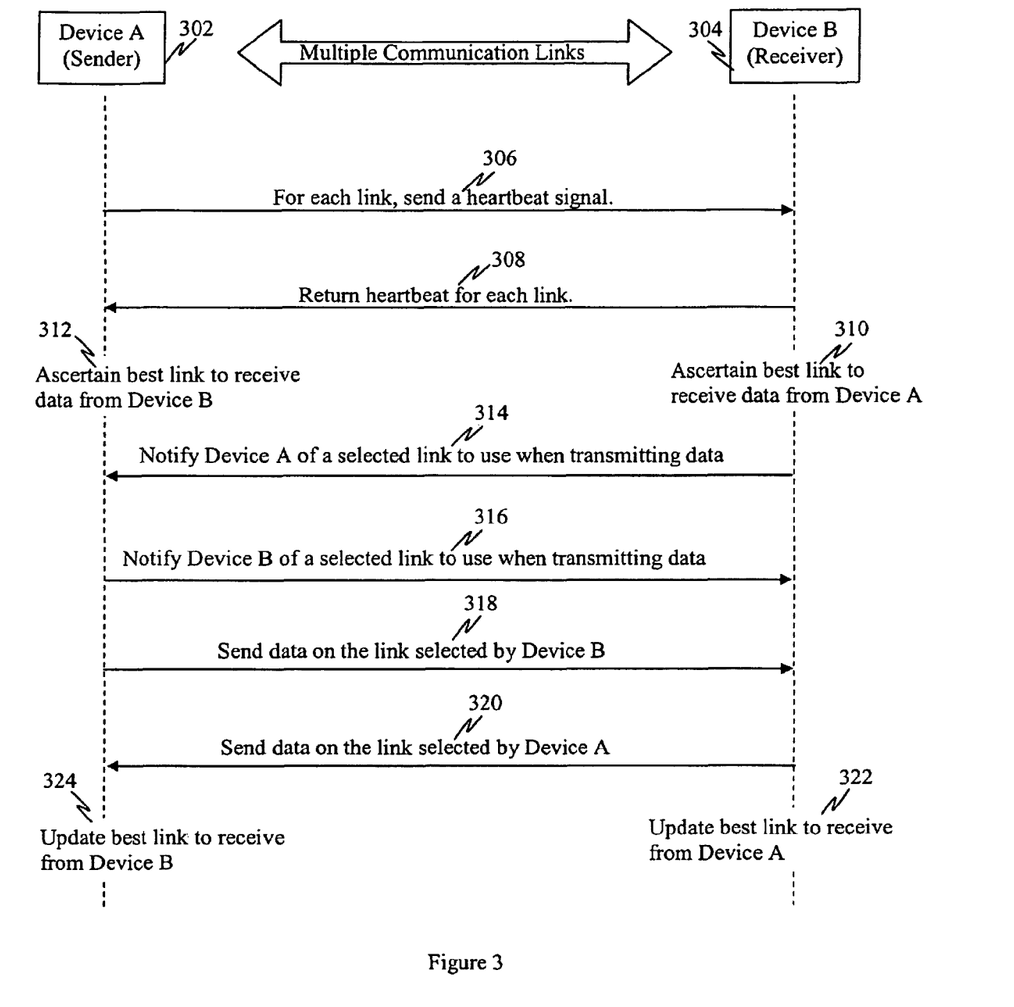
FIG. 3 illustrates an example dynamic traffic allocation between two devices having a plurality of communication links.

FIG. 3 illustrates an example dynamic traffic allocation between two devices having a plurality of communication links. In this example, a Device A 302 is the sender of data while a Device B 304 is the intended receiver of such data. Device A 302 and Device B 304 may each have a communication module as described in FIG. 2.

For each available link between Device A 302 and Device B 304, a heartbeat signal is sent 306 by Device A 302. This heartbeat signal may be sent periodically or as needed. In some implementations, a return heartbeat 308 may be received from Device B 302. The heartbeat 306 for each communication link maybe utilized by Device B 304 to ascertain the characteristics of that communication link. This may be done for all available links between Device A 302 and Device B 304. Once the Device B 304 has obtained link characteristics for a plurality of the available communication links, it may ascertain the best communication link to receive data from Device A 310. Similarly, Device A 302 may ascertain the best communication link to receive data from Device B 312.

Device B 304 may then notify Device A 302 of a selected communication link to use when transmitting data to Device B 314. Similarly, Device A 302 may notify Device B 304 of a selected communication link to use when transmitting data to Device A 316. In an alternative example, Device B 304 may rank the available communication links in an order of preference and provide such order of preference to Device A 302. In yet another example, Device B 304 may ascertain what percentage of traffic from Device A 302 should be received in each of the available communication links. Device B 304 then provides this information to Device A 302.

Device A 302 then transmits data on the communication link selected by Device B 318. Similarly, Device B 304 then transmits data on the communication link selected by Device A 320. Devices A and B may periodically or continually monitor the characteristics of available communication links and update the best communication link to receive on 322 and 324.

Figure 4:
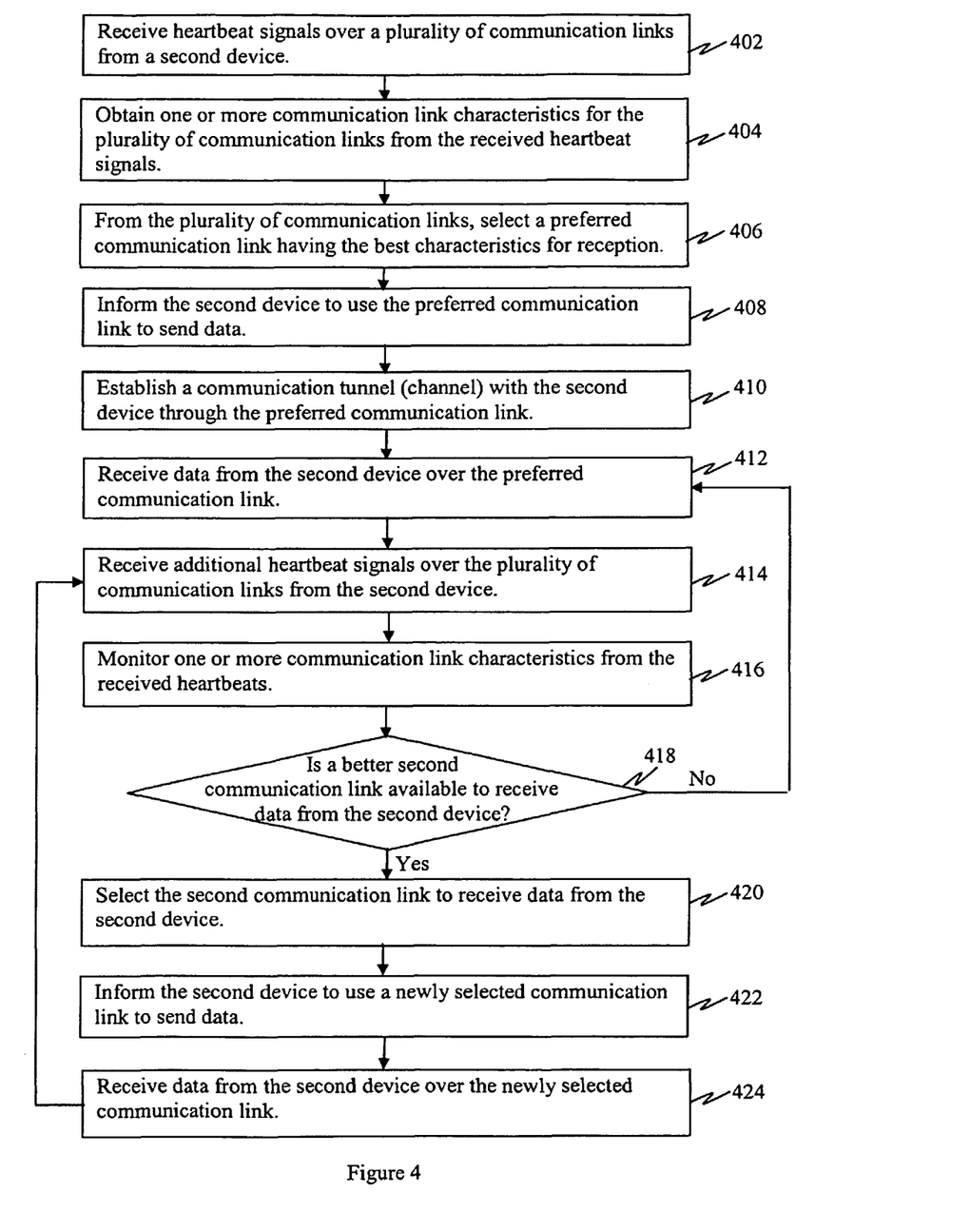
FIG. 4 is a flow diagram illustrating a method operational on a "receiving" first device to facilitate dynamic traffic allocation with a "transmitting" second device.

FIG. 4 is a flow diagram illustrating a method operational on a "receiving" first device to facilitate dynamic traffic allocation with a "transmitting" second device. In this example, the "receiving" first device decides on which channel it will receive data from the "transmitting" second device. It is assumed that multiple communication links are available between the first and second devices. The first device may receive heartbeat signals over a plurality of communication links from the second device 402. These heartbeat signals may be sent by the first device when data is to be transmitted to the second device. In another example, the first device may send heartbeat signals or pings are sent over the plurality of communication links to the second device and, in response, the first device may send its heartbeat signals to the second device. One or more communication link characteristics for the plurality of communication links are obtained from the received heartbeat signals 404. From the plurality of communication links, a preferred communication link having the best characteristics for reception is selected 406 by the first device. The second device is informed to use the preferred communication link to send data 408 to the first device. In one example, the first device may establish a communication tunnel (channel) with the second device through the preferred communication link 410. The first device may then receive data from the second device over the preferred communication link 412.

The first device may periodically or sporadically update its preferred communication link. Additional heartbeat signals may be received over the plurality of communication links from the second device 414. One or more communication link characteristics are monitored based on the received heartbeats 416. The first device then determines whether a better communication link is available to receive data from the second device 418. If a better communication link is available, the first device selects the second communication link to receive data from the second device and informs the second device to use a newly selected communication link to send data 422. The first device may then receive data from the second device over the newly selected communication link 424.

Figure 5:
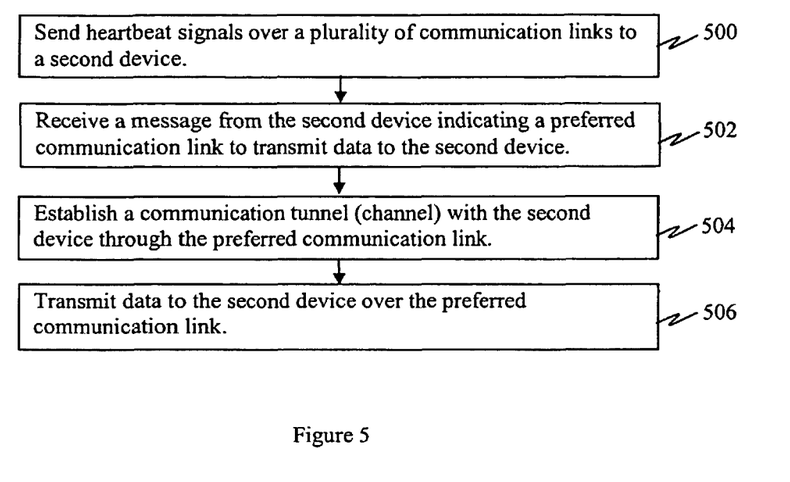
FIG. 5 is a flow diagram illustrating a method operational on a "transmitting" first device to facilitate dynamic traffic allocation with a "receiving" second device.

FIG. 5 is a flow diagram illustrating a method operational on a "transmitting" first device to facilitate dynamic traffic allocation with a "receiving" second device. The first device may send heartbeat signals over a plurality of communication links to a second device 502. In one example, the heartbeat signals received from the second device may be the return leg of roundtrip heartbeat signals sent by the first device. Alternatively, the heartbeat signals may be independently sent by the second device when it wants to transmit to the first device. The second device may use the heartbeat signal in each communication link to determine such link characteristics as bandwidth, delay, and/or jitter. The first device may then receive a message from the second device indicating a preferred communication link to transmit data to the second device. Optionally, a communication tunnel (channel) may be established with the second device through the preferred communication link. The first device may then transmit data to the second device over the preferred communication link. The second device may update its preferred communication link periodically based on changes in link conditions over the plurality of communication links.

According to another feature, low-level data compression may be performed by traffic allocation communication modules on data transmitted over each communication link. For example, data to be transmitted may be compressed and/or deflated upon entering the tunnels at a transmitting device and decompressed or inflated upon exiting or being received by a receiving device.

The examples described herein may be implemented in any situation in which there are two or more communication links having different transmission characteristics and/or having varying behavior. The concepts and features described herein may be implemented on either software, hardware, or a combination of both.

One or more of the components, operations, and/or functions illustrated in FIGS. 1, 2, 3, 4, and 5 may be rearranged and/or combined into a single component, operation, and/or function or separated into several components, operations, and/or functions without departing from the spirit and/or scope of the disclosure. Additional elements, components, operations, and/or functions may also be added without departing from the spirit and/or scope of the disclosure. The apparatus, devices, and/or components illustrated in FIGS. 1, 2, and/or 3 may be configured t perform one or more of the methods, features, or operations described in FIGS. 3, 4, and/or 5.

Those of skill would further appreciate that the various illustrative logical blocks, modules, circuits, and algorithm operations described in connection with the examples disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system.

It should be noted that the foregoing configurations are merely examples and are not to be construed as limiting the spirit and/or scope of the disclosure. The description of these examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a first device, comprising:
receiving heartbeat signals over a plurality of communication links from a second device, wherein each of the plurality of communication links spans different networks;
wherein the plurality of communication links comprises two or more different communication links selected from a set comprising: at least one satellite communication link, at least one cellular communication link, and at least one private communication network;
obtaining one or more communication link characteristics for the plurality of communication links from the received heartbeat signals;
removing one or more communication links from the plurality of communication links based on one or more communication link characteristics;
selecting a first communication link from the plurality of communication links, the selecting based on the one or more communication link characteristics of the plurality of communication links;
wherein the first device is in communication with a third device via a second communication link;
wherein the second communication link is a particular communication link from the plurality of communication links after that particular communication link has been dropped as a communication link between the first device and the second device;
informing the second device to use the first communication link to send data; and
receiving data from the second device over the first communication link.

2. The method of claim 1 further comprising:
receiving additional heartbeat signals over the plurality of communication links from the second device;
obtaining one or more communication link characteristics from the received additional heartbeat signals; and
selecting a third communication link from the plurality of communication links to receive data from the second device, the selecting based on the one or more communication link characteristics of the plurality of communication links obtained from the received additional heartbeat signals.

3. The method of claim 2 further comprising:
informing the second device to use the third communication link to send data to the first device; and
receiving data from the second device over the third communication link.

4. The method of claim 1 further comprising:
establishing a communication tunnel with the second device through the first communication link.

5. The method of claim 4 further comprising:
decompressing the received data.

6. The method of claim 1 wherein the one or more communication link characteristics includes at least one of bandwidth, delay, or jitter.

7. The method of claim 1 further comprising:
sending heartbeat signals over the plurality of communication links to the second device; and
receiving a message from the second device indicating a third communication link of the plurality of communication links to transmit data to the second device.

8. The method of claim 7 further comprising:
establishing a communication tunnel with the second device through the third communication link.

9. The method of claim 7 further comprising:
transmitting data to the second device over the third communication link.

10. The method of claim 1, wherein a different communication interface is used by the first device for communicating over each communication link from the plurality of communication links.

11. The method of claim 1, wherein a different communication interface is used by the first device for establishing each communication link from the plurality of communication links.

12. The method of claim 1, wherein the at least two communication links from the plurality of communication links uses different transmission protocols.

13. The method of claim 1, wherein at least two of the plurality of communication links use different transmission protocols.

14. The method of claim 1, wherein at least two of the plurality of communication links use different transmission mediums.

15. The method of claim 14, wherein each different transmission medium uses a different transmission protocol.

16. The method of claim 1, wherein at least one of the communication links is a one way communication link between the first device and the second device and at least another of the communication links is a two-way communication link between the first device and the second device.

17. The method of claim 1, wherein receiving, obtaining, selecting, ranking, informing and receiving are performed transparently to an application operational on the first device.

18. The method of claim 1, wherein receiving, obtaining, selecting, ranking, informing and receiving are performed transparently to a network protocol.

19. The method of claim 1, wherein the first and second devices are end points of each of the communication links.

20. The method of claim 1, wherein the first communication link is a cellular communication link.

21. The method of claim 1, wherein the first communication link is a satellite communication link.

22. The method of claim 1, wherein the use of the first communication link is based on a percentage of traffic distribution over more than one communication link from the plurality of communication links.

23. The method of claim 1, further comprising:
ranking two or more communication links of the plurality of communication links in an order of preference;
transmitting an indication of the order of preference to the second device.

24. The method of claim 23, further comprising:
receiving data from the second device according to the order of preference.

25. The method of claim 23, wherein ranking of the two or more communication links is based on a percentage of traffic distribution over the two or more communication links from the plurality of communication links.

26. A first communication module comprising:
means for receiving heartbeat signals over a plurality of communication links from a second communication module, wherein each of the plurality of communication links spans different networks;
wherein the plurality of communication links comprises two or more different communication links selected from a set comprising: at least one satellite communication link, at least one cellular communication link, and at least one private communication network;
means for obtaining one or more communication link characteristics for the plurality of communication links from the received heartbeat signals;
means for removing one or more communication links from the set of communication links based on one or more communication link characteristics;
means for selecting a first communication link from the plurality of communication links, the selecting based on the one or more communication link characteristics of the plurality of communication links;
means for communication with a third communication module via a second communication link;
wherein the second communication link is a particular communication link from the plurality of communication links after that particular communication link has been dropped as a communication link between the first communication module and the second communication module;
means for informing the second communication module to use the first communication link to send data to the first communication module; and
means for receiving data from the second communication module over the first communication link.

27. The first communication module of claim 26 further comprising:
means for receiving additional heartbeat signals over the plurality of communication links from the second communication module;
means for obtaining one or more communication link characteristics from the received additional heartbeat signals; and
means for selecting a third communication link from the plurality of communication links to receive data from the second communication module, the selecting based on the one or more communication link characteristics of the plurality of communication links obtained from the received additional heartbeat signals.

28. The first communication module of claim 27 further comprising:
means for informing the second communication module to use the third communication link to send data to the first communication module; and
means for receiving data from the second communication module over the third communication link.

29. The first communication module of claim 26 further comprising:
means for establishing a communication tunnel with the second communication module through the first communication link.

30. The first communication module of claim 26 further comprising:
means for sending heartbeat signals over the plurality of communication links to the second communication module;
means for receiving a message from the second communication module indicating a third communication link to transmit data to the second communication module; and
means for transmitting data to the second communication module over the third communication link.

31. A first communication module comprising:
(i) a communication link analyzer configured to
receive heartbeat signals over a plurality of communication links from a second communication module, wherein each of the plurality of communication links spans different networks;
wherein the plurality of communication links comprises two or more different communication links selected from a set comprising: at least one satellite communication link, at least one cellular communication link, and at least one private communication network; and
obtain one or more communication link characteristics for the plurality of communication links from the received heartbeat signals;
remove one or more communication links from the set of communication links based on one or more communication link characteristics;
(ii) a link selector coupled to the communication link analyzer, the link selector configured to
select a first communication link from the plurality of communication links, the selecting based on the one or more communication link characteristics of the plurality of communication links, and
inform the second communication module to use the first communication link to send data to the first communication module; inform the first module to communicate with a third communication module via second communication link, wherein the second communication link is a particular communication link from the plurality of communication links after that particular communication link has been dropped as a communication link between the first communication module and the second communication module; and
(iii) a receiver to receive data from the second communication module over the first communication link.

32. The first communication module of claim 31 wherein the communication link analyzer is further configured to
receive additional heartbeat signals over the plurality of communication links from the second communication module, and
obtain one or more communication link characteristics from the received additional heartbeat signals.

33. The first communication module of claim 32 wherein the link selector is further configured to select a third communication link from the plurality of communication links to receive data from the second communication module; and
inform the second communication module to use the third communication link to send data to the first communication module.

34. The first communication module of claim 33 wherein the receiver is further configured to
receive data from the second communication module over the third communication link.

35. The first communication module of claim 31 further comprising:
a transmitter for sending heartbeat signals over the plurality of communication links to the second communication module;
a link indicator storage device for receiving a message from the second communication module indicating a third communication link to transmit data to the second communication module; and
a demultiplexer module coupled to the transmitter, the demultiplexer module to route data to the second communication module over the third communication link.

36. A non-transitory computer-readable storage medium having one or more instructions operational on a first device for dynamic communication link allocation, which when executed by a processor causes the processor to:
- receive heartbeat signals over a plurality of communication links from a second device, wherein each of the plurality of communication links spans different networks; wherein the plurality of communication links comprises two or more different communication links selected from a set comprising: at least one satellite communication link, at least one cellular communication link, and at least one private communication network;
- obtain one or more communication link characteristics for the plurality of communication links from the received heartbeat signals;
- remove one or more communication links from the set of communication links based on one or more communication link characteristics;
- select a first communication link from the plurality of communication links, the selecting based on the one or more communication link characteristics of the plurality of communication links;
- select a second communication link from the plurality of communication links, wherein the second communication link is a particular communication link from the plurality of communication links after that particular communication link has been dropped as a communication link between the first device and the second device;
- inform the second device to use the first communication link to send data; and
- receive data from the second device over the first communication link.

37. The computer-readable storage medium of claim 36 further having one or more instructions which when executed by a processor causes the processor to:
- receive additional heartbeat signals over the plurality of communication links from the second device;
- obtain one or more communication link characteristics from the received additional heartbeat signals; and
- select a third communication link from the plurality of communication links to receive data from the second device, the selecting based on the one or more communication link characteristics of the plurality of communication links obtained from the received additional heartbeat signals.

38. The computer-readable storage medium of claim 37 further having one or more instructions which when executed by a processor causes the processor to:
- inform the second device to use the third communication link to send data to the first device; and
- receive data from the second device over the third communication link.

39. The computer-readable storage medium of claim 36 further having one or more instructions which when executed by a processor causes the processor to:
- send heartbeat signals over the plurality of communication links to the second device; and
- receive a message from the second device indicating a third communication link of the plurality of communication links to transmit data to the second device.

40. The computer-readable storage medium of claim 39 further having one or more instructions which when executed by a processor causes the processor to:
- transmit data to the second device over the third communication link.

41. A processor comprising:
- a circuit configured to receive heartbeat signals over a plurality of communication links from a second device, wherein each of the plurality of communication links spans different networks; wherein the plurality of communication links comprises two or more different communication links selected from a set comprising: at least one satellite communication link, at least one cellular communication link, and at least one private communication network;
- obtain one or more communication link characteristics for the plurality of communication links from the received heartbeat signals;
- remove one or more communication links from the set of communication links based on one or more communication link characteristics;
- select a first communication link from the plurality of communication links, the selecting based on the one or more communication link characteristics of the plurality of communication links;
- establish communication with a third device via a second communication link;
- wherein the second communication link is a particular communication link from the plurality of communication links after that particular communication link has been dropped as a communication link between the first device and the second device;
- inform the second device to use the first communication link to send data; and
- receive data from the second device over the first communication link.

42. The processor of claim 41, wherein the circuit is further configured to
- receive additional heartbeat signals over the plurality of communication links from the second device;
- obtain one or more communication link characteristics from the received additional heartbeat signals; and
- select a third communication link from the plurality of communication links to receive data from the second device, the selecting based on the one or more communication link characteristics of the plurality of communication links obtained from the received additional heartbeat signals.

43. The processor of claim 42 wherein the circuit is further configured to
- inform the second device to use the third communication link to send data to the first device; and
- receive data from the second device over the third communication link.

44. The processor of claim 41 wherein the circuit is further configured to
- send heartbeat signals over the plurality of communication links to the second device;
- receive a message from the second device indicating a third communication link of the plurality of communication links to transmit data to the second device; and
- establish a communication tunnel with the second device through the third communication link.

45. The processor of claim 44 wherein the circuit is further configured to
- transmit data to the second device over the third communication link.

* * * * *